Aug. 17, 1948.    H. O. IRMSCHER    2,447,014
MANUFACTURE OF ESSENCE CONTAINING
PACKAGES FOR BREWING BEVERAGES
Filed Nov. 25, 1940    4 Sheets-Sheet 3
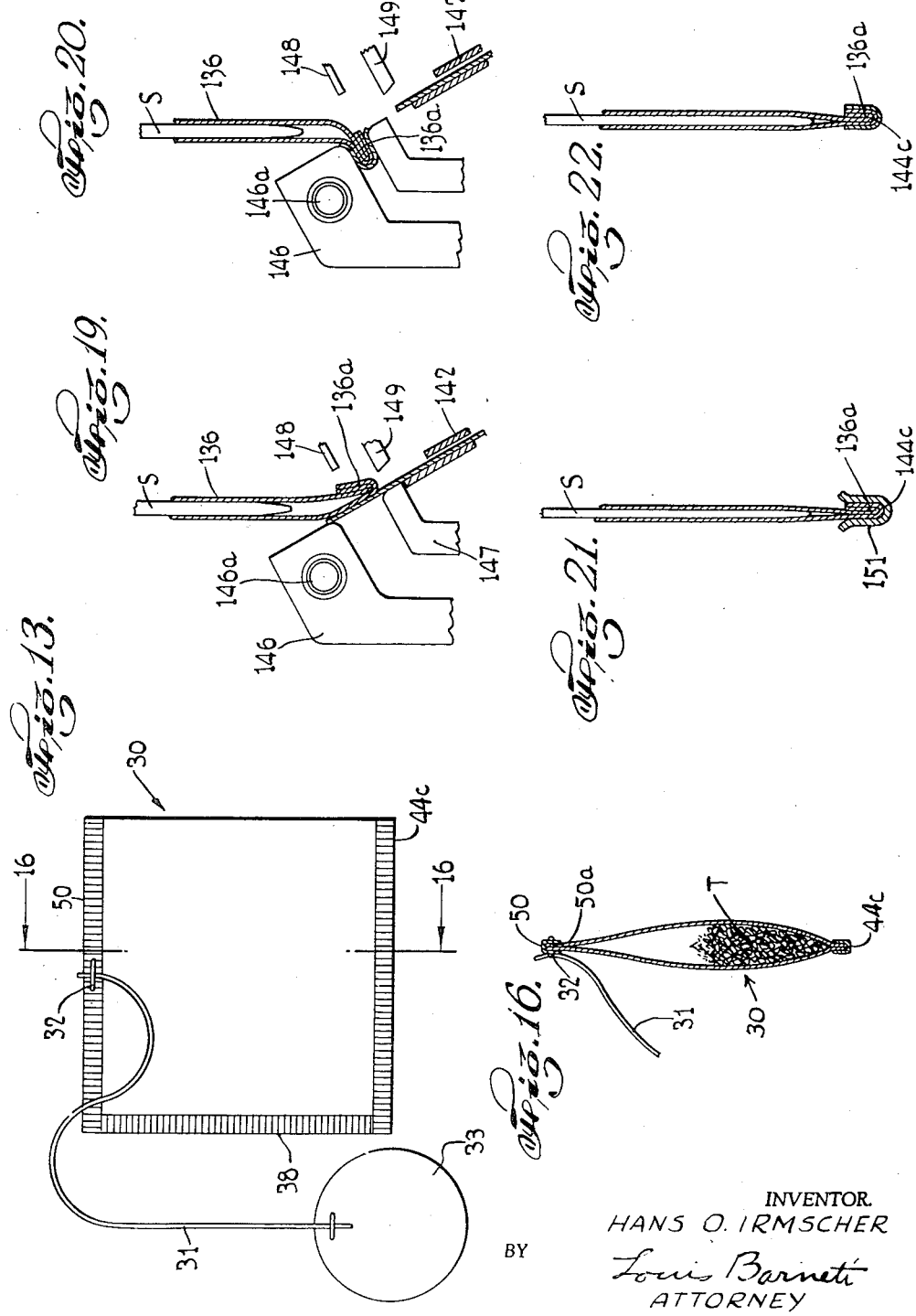
INVENTOR.
HANS O. IRMSCHER
BY
Louis Barnett
ATTORNEY Aug. 17, 1948.  H. O. IRMSCHER  2,447,014
MANUFACTURE OF ESSENCE CONTAINING
PACKAGES FOR BREWING BEVERAGES
Filed Nov. 25, 1940  4 Sheets-Sheet 4
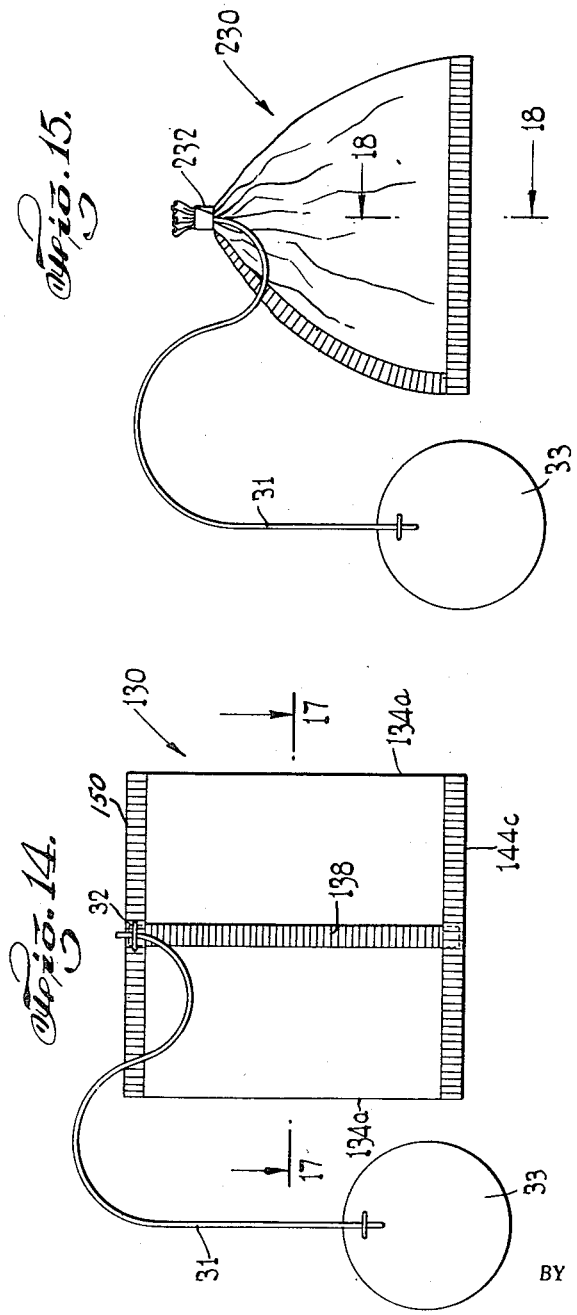
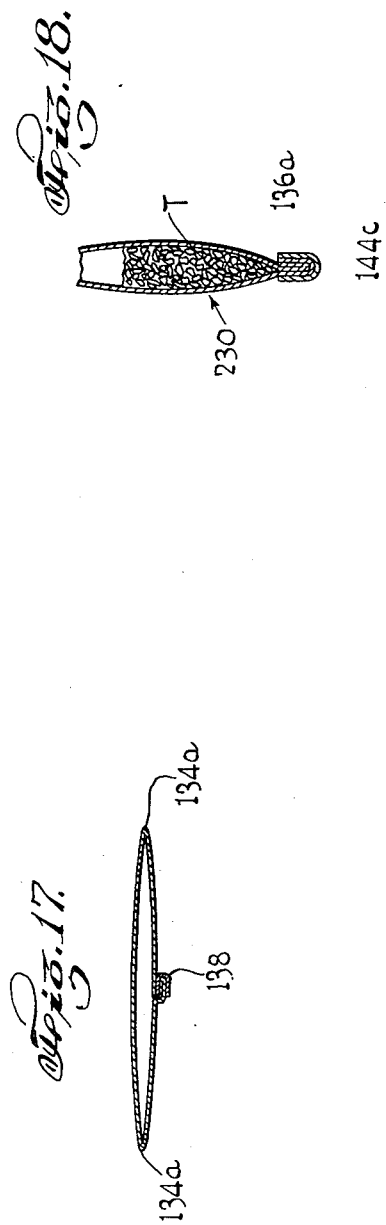
INVENTOR.
HANS O. IRMSCHER
BY Louis Barnett
ATTORNEY Patented Aug. 17, 1948

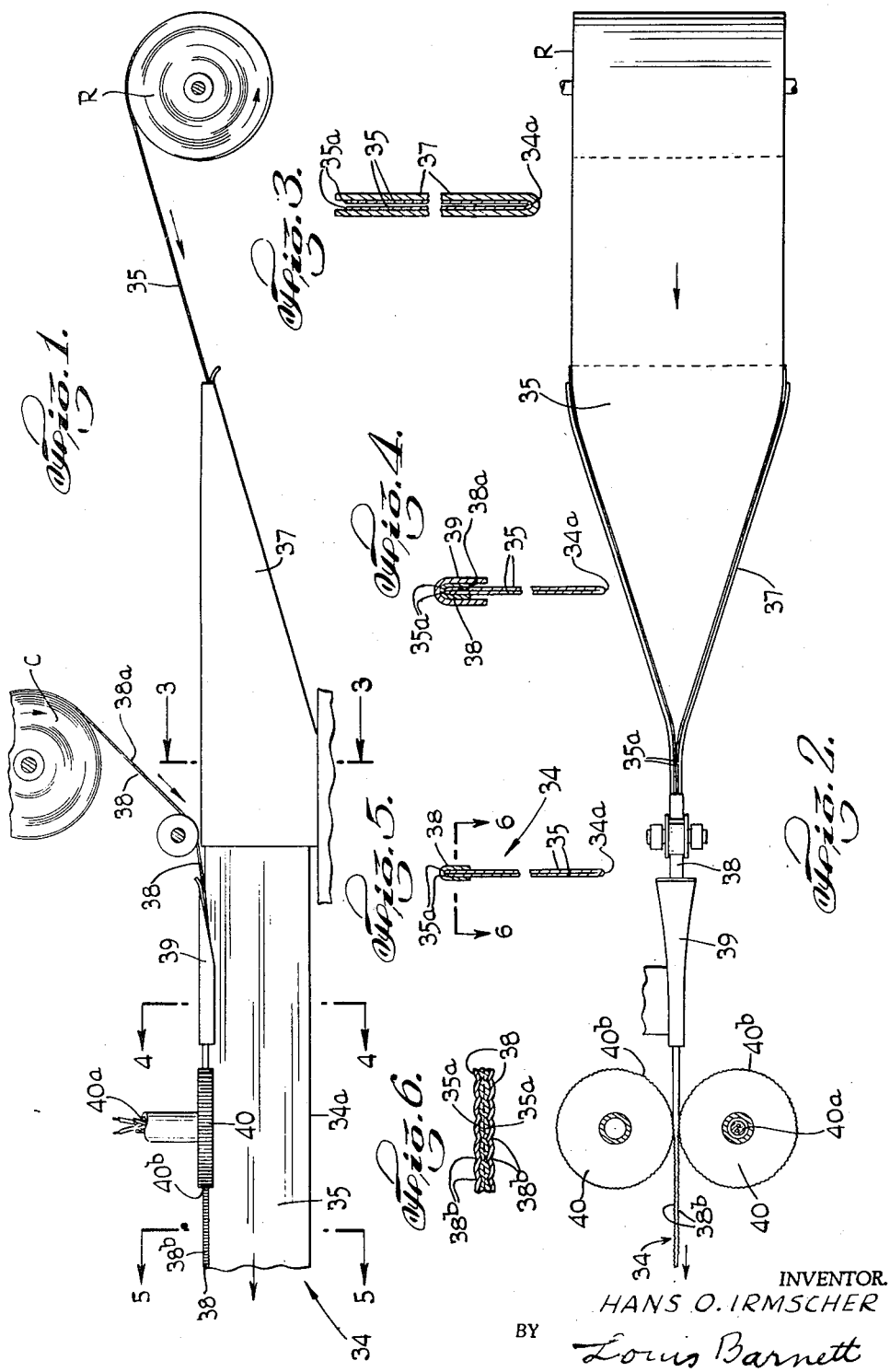

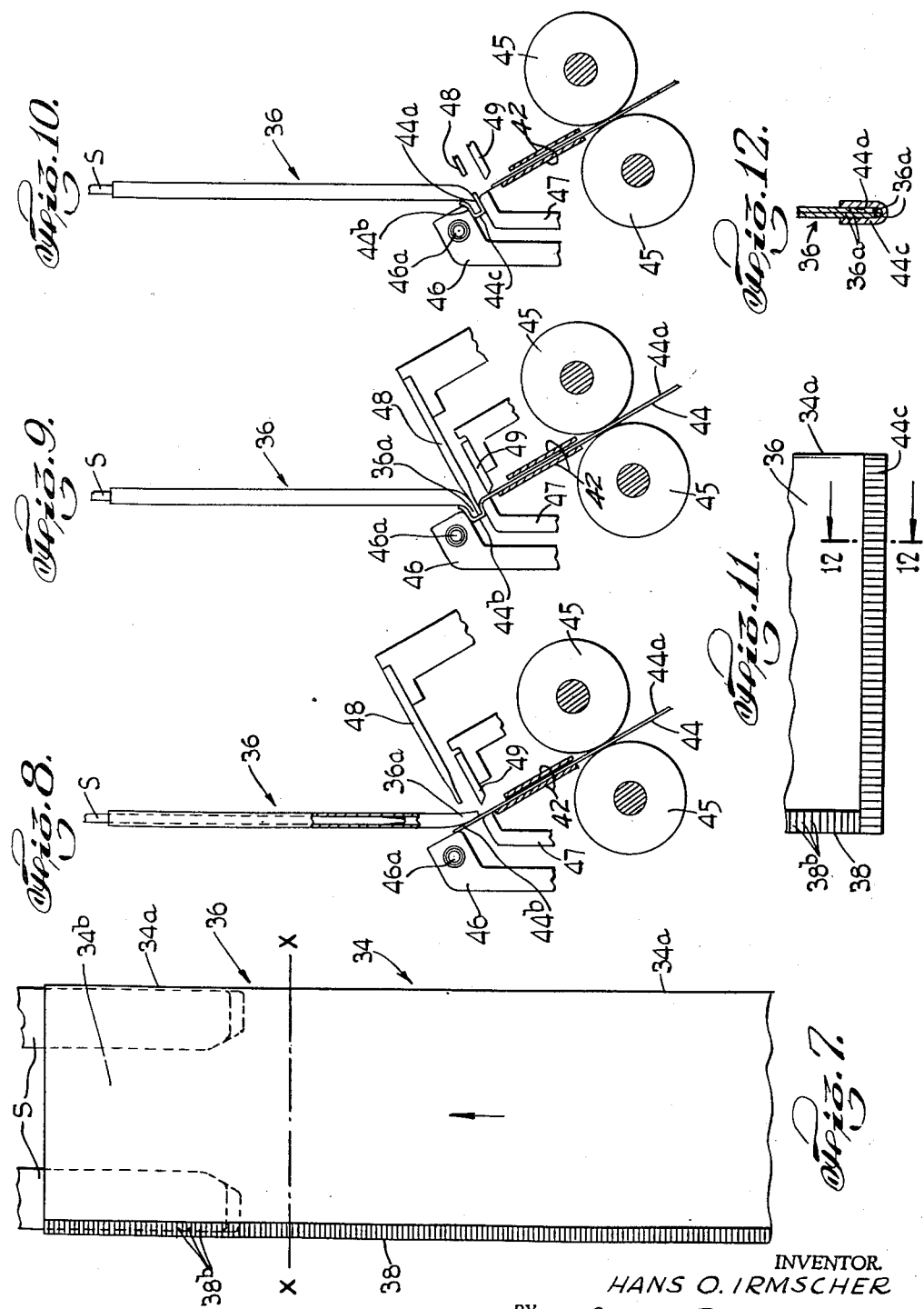

2,447,014

UNITED STATES PATENT OFFICE 2,447,014

MANUFACTURE OF ESSENCE CONTAINING PACKAGES FOR BREWING BEVERAGES

Hans O. Irmscher, Roslyn, N. Y., assignor to National Urn Bag Co., Inc., a corporation of New York Application November 25, 1940, Serial No. 367,051

2 Claims. (Cl. 93—3)

This invention relates to the manufacture and filling of containers and bags. The embodiment herein described is particularly directed to the novel method of packaging tea, coffee and similar essence containing products, such packages being made and sold as complete articles of manufacture for use in brewing beverages, as for example, so-called tea-balls of the "pouch" and the "square" or "pillow" shaped types.

Among the objects of the invention is to generally improve the manufacture of filled packages of the character described which shall be capable of being utilized inexpensively and in a simple and easy manner for large scale production of neat and attractive appearing articles, and which shall be efficient and practical to a high degree.

Other objects of this invention will in part be obvious and in part hereinafter pointed out.

The invention accordingly consists in the features of the method, steps of the process exemplified in the method hereinafter described and the packages manufactured by said process, and of which the scope of application will be indicated in the following claims.

In the accompanying drawing in which possible illustrative embodiments of the invention are shown:

Figs. 1 and 2 are side elevational and top plan views, respectively, illustrating the steps of forming a tubular structure from a web or strip and applying heat sealed edge binding to the longitudinal seam of said structure in the improved manufacturing method of making tea-balls, or the like, embodying the invention;

Figs. 3, 4 and 5 are cross-sectional views taken at lines 3—3, 4—4 and 5—5, respectively, in Fig. 1;

Fig. 6 is an enlarged detailed cross-sectional view of the edge bound longitudinal seam of said tubular structure corresponding to a cut taken on the line 6—6 in Fig. 5;

Fig. 7 is a fragmentary view illustrating the method of severing the tubular structure into unit sections and suspending same for making the individual bag embodying the invention;

Figs. 8, 9 and 10 are fragmentary diagrammatic views illustrating successive steps in a method of applying heat sealed edge bound bottom closures on unit sections to provide bags, embodying the invention;

Fig. 11 is a fragmentary portion of a bag unit section with a finished bottom closure applied by the method shown in Figs. 8, 9 and 10;

Fig. 12 is a cross-sectional view taken on the line 12—12 in Fig. 11;

Figs. 13, 14 and 15 are front elevational views of completely manufactured tea-balls embodied in the invention, Figs. 13 and 14 showing two types of "square" tea-balls and Fig. 15 a "pouch" type;

Figs. 16, 17 and 18 are cross-sectional views taken on line 16—16, line 17—17 and line 18—18 in Figs. 13, 14 and 15, respectively, in Fig. 18 a preformed type of folded bottom closure being shown;

Figs. 19 and 20 are fragmentary diagrammatic views similar to Figs. 8 and 10, respectively, illustrating an initial and final step in applying heat sealed edge-bound folded bottom closure of bags;

Fig. 21 is a cross-sectional view illustrating the prefolding of a bottom closure prior to the application of the heat sealed edge-binding shown in Figs. 19 and 20; and Fig. 22 is a cross-sectional view of the completed heat sealed edge-binding on the folded bottom closure after completing the operation shown in Figs. 19 to 21.

Referring in detail to Figs. 13, 14 and 15 of the drawing, 30, 130 and 230, respectively, denote two forms of complete "square" or "pillow" shaped and one form of "pouch" type tea bags, respectively, manufactured in accordance with the invention. Said tea bags each have a string handle 31 which may be anchored by suitable means such as a staple 32 or band 232, each string handle 31 being terminated at its free end with a tag 33.

The successive individual steps illustrating the improved method of forming a tubular structure 34 from a suitable continuously travelling web 35 of sheet material, which when cut into successive unit bag sections 36 form either the "square" or "pillow" and "pouch" types, are shown in Figs. 1 to 7, inclusive. The sheet material may be supplied from a roll R or other suitable source and fed as web 35 of the required width, said sheet material being of a suitable foraminous construction, as for example, filter paper, perforated parchment paper, cotton gauze or perforated Cellophane, or the like.

The web 35 as it continuously comes off the roll R may be fed to travel through a former 37 which centrally folds the web 35 longitudinally on itself to provide edge fold 34a and aligns the free edges 35a as shown in Figs. 1 to 3. As the folded web emerges from the former 37, an edge binding strip 38 is folded over or bent U-shape to position and retain the web edges 35a in close contact by a guide member 39, as shown in Figs. 1 to 4.

The binding strip 38 may be supplied from another roll or coil C or other suitable source and may be of the required width. Said strip 38 may be made of the same sheet material as web 35 described above which serves as a base layer and is coated on one surface thereof with an adhering substantially dry thermosetting "partial fused plastic" lamina 38a which can be permanently heat sealed to form joint seams of the character more fully described in the application of Theodore F. Menzel, Serial No. 335,694, filed May 17, 1940, now Patent No. 2,306,399, issued December 29, 1942, or of other suitable paper strip coated with a plastic thermosetting coating having properties hereinafter described.

In practising the invention for the manufacture of tea-balls, coffee balls and the like, the sheet material forming the web 35, strip 38 and the plastic thermosetting coating 38a must have inherent properties to withstand immersion in hot water without damage or disintegration and without the undue loss of tensile strength. The sheet material web 35 must permit ready passage therethrough of liquids for forming a brew and straining the contents T on the passage of the brew out of such balls. The compositions of said web 35, strip 38 and coating 38a should be such as to be insoluble in hot boiling water, impart no odor or taste even of the slightest degree to the brew, and be absolutely free from giving the brew the least harmful toxic effect.

The coated strip 38 after being continuously fed from coil C and folded U-shape to travel over the web edges 35a by guiding member 39 with the lamina coating 38a facing said web edges 35a, then passes between a pair of rollers 40, which may be electrically heated by suitable means 40a. Said rollers 40 may be provided with knurled peripheral surfaces 40b to impart a crimping as at 38b while pressing and heat sealing said coating 38a in the application of the edge binding formed by strip 38 on web edges 35a, thereby producing the tubular structure 34 with longitudinally extending edge seam from the web 35 and strip 38 as shown in Figs. 1 to 7, inclusive.

In the art of tea-ball manufacturing, a method for producing same to be of commercial utility must be readily adapted for incorporation in the operation of high-speed, automatic machinery so that low cost, large scale production is made possible. To this end the tubular structure 34 may be made as described above and supplied as required to a high-speed bag forming and filling machine. Or, the manufacture of the tubular structure 34 may be made part of a unitary machine and fed as it is produced to a cooperating part of such machine which takes the tubular structure 34 as illustrated in Fig. 7 and mounts the leading end 34b thereof on suitable movable support S where each of such end portions is severed along line X—X into a unit section 36. The successive leading end of the remaining cut tubular structure 34 may be mounted on other like suitable movable supports S and severed in the manner above described to provide a continuous flow of such unit sections 36.

Each unit section 36 then is provided with a bottom closure applied to the lower open end thereof to form a bag. This may be accomplished after the unit sections 36 are severed from the tubular structure 34 shown in Fig. 7, by providing a web 44 of sheet material having a thermosetting coating 44a similar to strip 38 with coating 38a but of a width equal to the unit section 36, then by positioning the lower open end of portion 36a of said unit section so that a strip 44b severed from web 44 can be folded around said open end portion 36a, pressed and heat sealed to provide the bottom closure of the bag from each of the unit sections 36.

The above described method is illustrated in Figs. 8 to 12, inclusive, where it is seen that the coated web 44 passes between cooperating feed rollers 45 through a guide member 42 to a pair of clamping jaws 46, 47. One of said jaws, as for example jaw 46, may be provided with an electric heater 46a. As shown in Fig. 8, when the open end portion 36a of the unit section 36 is placed against the coating 44a at the leading end 44b of the web 44, a pusher 48 folds said web leading end 44b with the edge portion 36a in between the jaws 46 and 47 as shown in Fig. 9. On retraction of the pusher 48, said web leading end 44b is severed by cutter 49 and simultaneously the jaws 46 and 47 clamp press said strip 44b to heat seal the same as shown in Fig. 10 to provide on being released the bottom closure seal strip 44c of the bag, a fragmentary portion being shown in Figs. 11 and 12.

The bags may now be partially filled with an essence containing product such as tea T and when a "pillow" shaped tea-bag is desired, a top closure is provided in the form of a strip 50 having a thermosetting coating which may be applied, severed, folded, pressed and heat sealed in the identical manner described above for applying and heat sealing strip 44b with coating 44a as illustrated and shown in Figs. 8 to 12, inclusive. The package enclosing the tea T may now have the end of the string handle 31 opposite the terminal tag 33 attached to the top closure strip 50 by suitable means such as staple 32, thus completing "square" or "pillow" shaped tea-ball 30, as shown in Figs. 13 and 16.

Where it is desired to manufacture "square" or "pillow" shaped tea-balls 130, the tubular structure 34 may be made in the identical manner as described above and illustrated in Figs. 1 to 7, inclusive, but instead of processing with the provision of the strip 44c forming a bottom closure for the tea-ball 30, with a folded edge 34a and the binding edge 38, the longitudinal seam 138 of tea-ball 130 is positioned by moving to extend centrally down one side of the tea-ball 130 and midway between opposite fold edges 134a which are provided. The application of a heat sealed bottom closure strip 144c to provide a bag, the partial filling of such bag with tea T, application of a heat sealed top closure strip 150, and attachment of a string handle 31 to complete the tea-ball 130 shown in Figs. 14 and 17 may then be consecutively performed in the same manner as described above for tea-ball 30. Thus it is seen that said seam 138 is centrally positioned prior to heat sealing the top and bottom strips 144c and 150, respectively. The longitudinal seam 138 makes a T-shaped configuration with bottom closure strip 144c and an H-shaped configuration with the bottom and top closure strip 144c and 150.

To make the "pouch" type of tea-ball 230, the steps illustrated in Figs. 1 to 12 and described above for tea-ball 30, are carried through. The bag formed is then partially filled with tea T and then instead of applying and heat sealing a top closure strip 50, the top closure is made by gathering the partially filled bag at the top opening and applying a band ring 232 for retaining the gathers closed and for anchoring the end of the string handle 31 as shown in Fig. 15.

As it is desirable to use as few materials as possible to package the tea T in the form of tea-balls to reduce the foreign matter of the brew to a minimum, the use of the thinnest filtering sheet material for the unit sections and for the closure strips is utilized. With such thin sheet material and closure strip, it is sometimes found that due to weight strain of the tea contents T and the decrease of the tensile strength of the sheet material when immersed in boiling water, that the bottom closure portion breaks releasing the tea T. To overcome such objection where experienced, the steps of forming the bottom closure construction are modified to provide a reinforcing folded seam 136a at the bottom portion of the unit section 36 as shown in Fig. 22, instead of merely sealing in the unfolded end portion 36a illustrated and shown in Figs. 8 to 12.

The steps of reinforcing bottom closures to form folded seams 136a are illustrated in Figs. 19 to 22, inclusive, in which it is seen that the unit sections 136 are performed using a shaper 151 with the fold 136a before the binding strip 144c is applied, pressed and heat sealed. It is to be understood that such reinforced closures with the fold 136a may be applied in the tea bag constructions 130 and 230 and also to the top closure binding strip if desired. With the exception of the performing of the fold 136a at the bottom closure as shown in Figs. 21 and 22, the same means and method for folding the web 44, cutting the binding strip 44b of the coated web 44 and heat sealing may be used as illustrated in Figs. 8 to 10 as modified in Figs. 19 to 21, using jaws 146, 147, heater 146a in the jaws 146, guide member 142, pusher 148 and cutter 149.

It is therefore seen that there is provided an improved method and article of manufacture in which the several objects of the invention are achieved and which are well adapted to meet the conditions of practical use.

As various possible embodiments of the invention may be made in the above invention and as various changes may be made in the embodiments and method above set forth, it is to be understood that all matters herein set forth and shown in the accompanying drawing are to be interpreted as illustrative and not in a limiting sense.

Having thus described my invention I claim as new and desire to secure by Letters Patent:

1. In a method of making a package of the character described, the steps of severing a flattened tubular structure formed with a single longitudinally extending edge fold seam to provide a section unit with an open end, placing contiguous edge portions of said open end to extend across a thermosetting coated side of a web while in flattened position, folding and simultaneously securing said web with the coated side in face to face relation around said open side to form a closure and pressure heating said folded web against the outer surfaces of said edge portions to seal said closure.

2. The method of making packages of the character described consisting in folding over on itself longitudinally a web of filtering material while continuously travelling, and simultaneously securing the edges together by applying a heat sealing edge binding folded over thereon to form a flattened single seam tubular body, cutting successive unit sections off said structure, and simultaneously folding and heat sealing a bottom closure edge binding strip about an open end of each unit section to form a bag.

HANS O. IRMSCHER.

REFERENCES CITED

The following references are of record in the file of this patent:

UNITED STATES PATENTS

| Number | Name | Date |
| --- | --- | --- |
| 1,780,142 | Becker et al. | Oct. 28, 1930 |
| 1,899,207 | Munson | Feb. 28, 1933 |
| 1,975,253 | Connolly | Oct. 2, 1934 |
| 2,037,110 | Bischoff | Apr. 14, 1936 |
| 2,103,339 | Salfisberg | Dec. 28, 1937 |
| 2,137,243 | Heyman | Nov. 22, 1938 |
| 2,138,358 | Salfisberg | Nov. 29, 1938 |
| 2,192,605 | Salfisberg | Mar. 5, 1940 |
| 2,213,602 | Yates | Sept. 3, 1940 |
| 2,146,308 | Maxfield | Feb. 7, 1939 |